United States Patent
Izmailov et al.

(10) Patent No.: US 9,403,183 B2
(45) Date of Patent: Aug. 2, 2016

(54) METHODS OF MATERIAL HYDROPHILIZATION BY GLYCIDOL-CONTAINING SILOXANES

(71) Applicant: SAMSUNG ELECTRONICS CO., LTD., Suwon-si, Gyeonggi-do (KR)

(72) Inventors: Boris Alexandrovich Izmailov, Moscow (KR); Elena Nikolaevna Rodlovskaya, Lyubertsy (RU); Galy Dmitrievna Markova, Moscow (RU); Oleg Valerievich Baranov, Moscow (RU); Valeri Alexandrovich Vasnev, Moscow (RU); Won-Cheol Jung, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 738 days.

(21) Appl. No.: 13/708,687

(22) Filed: Dec. 7, 2012

(65) Prior Publication Data

US 2013/0149545 A1   Jun. 13, 2013

(30) Foreign Application Priority Data

Dec. 7, 2011   (RU) ................................. 2011149715
Nov. 7, 2012   (KR) ........................ 10-2012-0125681

(51) Int. Cl.
| | |
|---|---|
| B05D 1/36 | (2006.01) |
| C09D 7/00 | (2006.01) |
| B05D 5/00 | (2006.01) |
| C09D 183/08 | (2006.01) |
| C08G 77/04 | (2006.01) |
| C08G 77/26 | (2006.01) |

(52) U.S. Cl.
CPC .. *B05D 1/36* (2013.01); *B05D 5/00* (2013.01); *C09D 7/00* (2013.01); *C09D 183/08* (2013.01); *C08G 77/045* (2013.01); *C08G 77/26* (2013.01); *Y10T 428/31612* (2015.04); *Y10T 428/31663* (2015.04)

(58) Field of Classification Search
None
See application file for complete search history.

(56) References Cited

U.S. PATENT DOCUMENTS

| | | | |
|---|---|---|---|
| 4,978,462 A | 12/1990 | Sheppard | |
| 6,015,398 A * | 1/2000 | Arimatsu | ................ A61M 5/32 604/265 |

(Continued)

FOREIGN PATENT DOCUMENTS

| | | | |
|---|---|---|---|
| DE | 3932276 A1 | 3/1990 | |
| DE | WO 2011134869 A2 * | 11/2011 | ............ C07F 7/0852 |
| JP | 2000-129213 A | 5/2000 | |

(Continued)

OTHER PUBLICATIONS

Machine translation of SU 484234; Mar. 1976.*

*Primary Examiner* — Michael P Rodriguez
(74) *Attorney, Agent, or Firm* — Cantor Colburn LLP

(57) ABSTRACT

A method of imparting hydrophilicity to a surface of a material, which includes providing a base material having a surface; applying and chemically fixing a siloxane oligomer represented by Chemical Formula 1 to the surface of the base material to form a siloxane-modified surface; and applying a glycidol compound represented by Chemical Formula 2 to the siloxane-modified surface; and carrying out a reaction therebetween to form an organosiloxane coating having a N,N-bis(hydroxyalkyl)aminoalkyl group:

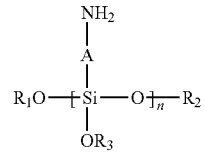

Chemical Formula 1 wherein $R_1$, $R_2$, and $R_3$ are the same or different and are each independently hydrogen or a C1 to C3 alkyl group, A is a single bond or a C1 to C5 alkylene group, and n ranges from 2 to 30;

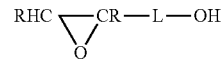

[Chemical Formula 2]

wherein each R is the same or different, and is as defined herein, and L is a substituted or unsubstituted C1 to C3 alkylene group.

10 Claims, 1 Drawing Sheet

(56) References Cited

U.S. PATENT DOCUMENTS

| | | |
|---|---|---|
| 6,218,560 B1 | 4/2001 | Abele et al. |
| 7,863,397 B2 | 1/2011 | Lange et al. |
| 2013/0123530 A1* | 5/2013 | Boehm ................ C07F 7/0852 556/423 |

FOREIGN PATENT DOCUMENTS

| | | |
|---|---|---|
| JP | 2000-186150 A | 7/2000 |
| JP | 2002-173664 A | 6/2002 |
| RU | 2370583 C2 | 10/2009 |
| SU | 484234 * | 3/1976 |

* cited by examiner

FIG. 1

METHODS OF MATERIAL HYDROPHILIZATION BY GLYCIDOL-CONTAINING SILOXANES

CROSS-REFERENCE TO RELATED APPLICATION

This application claims priority to and the benefit of Russian Patent Application No. 2011149715, filed on Dec. 7, 2011 and Korean Patent Application No. 10-2012-0125681, filed on Nov. 7, 2012, and all the benefits accruing therefrom under 35 U.S.C. §119, the contents of which in their entirety are incorporated herein by reference.

BACKGROUND

1. Field

A method of manufacturing modified materials is disclosed. The method may be used for imparting hydrophilic surface properties to various materials.

2. Description of the Related Art

One method of hydrophilic processing of a textile material with a composition containing a mixture of polyorganosiloxane and polydiorganosiloxane is described in Patent No. 3,932,276 of the Federal Republic of Germany (Composition for Treatment of Textiles and Method of Processing). The polyorganosiloxane prepared according to that method possesses hydrophilic properties, but insoluble in water. To increase its emulsifying ability in the processing of fibrous materials another polyorganosiloxane is added, which functions as a surfactant. The disadvantage of this method is the instability of the emulsion, and its tendency to coagulate, caused by the properties of the applied polyorganosiloxanes.

Another method of providing a textile material made of various fibers with hydrophilic properties is disclosed in Russian Patent No. 2370583 entitled "Method of Providing Fibrous Materials with Hydrophilic Properties by Means of Oxyalkylenorganosiloxane Block Copolymers." However, this method uses oxyalkylenorganosiloxane in an amount of 1-5% based on a total weight of fibrous material. Thus, there remains a need for a material with enhanced hydrophilic properties.

The above information disclosed in this Background section is only for enhancement of understanding of the background of the invention and therefore it may contain information that does not form the prior art that is already known in this country to a person of ordinary skill in the art.

SUMMARY

An embodiment provides a method of imparting hydrophilic properties to a surface of various base materials.

Another embodiment provides an article including a hydrophilic surface modified by the aforementioned method.

According to an embodiment, the method of imparting hydrophilicity to a surface of a material includes providing a base material having a surface; and applying and chemically fixing a siloxane oligomer represented by Chemical Formula 1 to the surface of the base material to form a siloxane-modified surface; and applying a glycidol compound represented by Chemical Formula 2 to the siloxane-modified surface and carrying out a reaction therebetween to form an organosiloxane coating having an N,N-bis(hydroxyalkyl)aminoalkyl group:

Chemical Formula 1 wherein in Chemical Formula 1, $R_1$, $R_2$, and $R_3$ are the same or different, and are each independently hydrogen or a C1 to C3 alkyl group, A is a single bond or a C1 to C5 alkylene group, and n ranges from 2 to 30;

Chemical Formula 2 wherein in Chemical Formula 2, each R is the same or different, and is independently hydrogen, a C1 to C3 alkyl group, or a C1 to C3 hydroxyalkyl group, and L is a substituted or unsubstituted C1 to C3 alkylene group.

The base material may include an organic material, an inorganic material, or an organic-inorganic hybrid material, and may have a hydroxyl group, a carboxyl group, or a combination thereof on the surface thereof.

The base material may be subjected to a corona treatment, an ultraviolet ("UV") treatment, a plasma treatment, or a chemical treatment using hydrogen peroxide, hexafluoride isopropanol, or an acid to have a hydroxyl group, a carboxyl group, or a combination thereof on its surface.

The siloxane oligomer represented by Chemical Formula 1 may include oligo(aminopropyl)ethoxysilane, oligo(aminopropyl)methoxysilane, oligo(aminoethyl)methoxysilane, oligo(aminoethyl)ethoxysilane, oligo(aminobutyl)ethoxysilane, oligo(aminobutyl)methoxysilane, oligo(aminopentyl)ethoxysilane, oligo(aminopentyl)methoxysilane, or a combination thereof.

In Chemical Formula 1 of the siloxane oligomer, "n" may range from 4 to 16.

The glycidol compound represented by Chemical Formula 2 may be oxiranylmethanol, (3-propyl-2-oxiranyl)methanol, oxiranylethanol, 2-(2-methyl-2-oxiranyl)ethanol, oxiranylpropanol, or a combination thereof.

Applying and chemically fixing the siloxane oligomer to the surface of the base material may include wetting the surface of the base material with a solution containing the siloxane oligomer, and drying, heating, or drying and heating the wetted surface.

The solution containing the siloxane oligomer may be prepared by dissolving the siloxane oligomer represented by Chemical Formula 1 in a C1 to C10 alcohol in an amount of about 0.05 to about 10 weight % based on a total weight of the solution.

Applying and chemically fixing the glycidol compound to the siloxane-modified surface may include wetting the siloxane-modified surface with a solution containing the glycidol compound, and drying and heating the wetted surface.

The solution containing the glycidol compound may be prepared by dissolving the glycidol compound represented by Chemical Formula 2 in a C1 to C10 alcohol in an amount of about 1 to about 50 weight % based on a total weight of the solution.

According to another embodiment, an article having a hydrophilically-modified surface includes a base material and an organosiloxane coating chemically fixed on a surface of the base material, wherein the coating comprises a reaction product of a siloxane oligomer represented by Chemical Formula 1, or a polysiloxane derived therefrom with a glycidol compound represented by Chemical Formula 2 and comprising an N,N-bis(hydroxyalkyl)aminoalkyl group:

Chemical Formula 1 wherein in Chemical Formula 1, $R_1$, $R_2$, and $R_3$ are the same or different and are each independently hydrogen or a C1 to C3 alkyl group, A is a single bond or a C1 to C5 alkylene group, and n ranges from 2 to 30.

Chemical Formula 2

In Chemical Formula 2, each R is the same or different, and is independently hydrogen, a C1 to C3 alkyl group, or a C1 to C3 hydroxyalkyl group, and L is a substituted or unsubstituted C1 to C3 alkylene group.

The base material may include an organic material, an inorganic material, or an organic-inorganic hybrid material, and may have a hydroxyl group, a carboxyl group, or a combination thereof on the surface.

The base material may include a polymer, wood, leather, glass, a metal, a metal oxide, a metal nitride, a ceramic material, or a combination thereof.

The siloxane oligomer represented by Chemical Formula 1 may include oligo(aminopropyl)ethoxysilane, oligo(aminopropyl)methoxysilane, oligo(aminoethyl)methoxysilane, oligo(aminoethyl)ethoxysilane, oligo(aminobutyl)ethoxysilane, oligo(aminobutyl)methoxysilane, oligo(aminopentyl)ethoxysilane, oligo(aminopentyl)methoxysilane, or a combination thereof.

The glycidol compound represented by Chemical Formula 2 may be oxiranylmethanol, (3-propyl-2-oxiranyl)methanol, oxiranylethanol, 2-(2-methyl-2-oxiranyl)ethanol, oxiranylpropanol, or a combination thereof.

The coating may display bands for a C—OH bond, a C—N bond, a Si—O—Si bond, a Si—O—C bond, and a Si—C bond in its infrared spectroscopy spectrum.

The surface of the article may have a water contact angle of about 20° or less.

The article may be an interior or exterior part of a home appliance, an anti-fogging glass, or a glass for use in a vehicle.

BRIEF DESCRIPTION OF THE DRAWINGS

These and/or other aspects of the present disclosure will become apparent and more readily appreciated from the following description of the embodiments, taken in conjunction with the accompanying drawings in which.

DETAILED DESCRIPTION

This disclosure will be described more fully hereinafter with reference to the accompanying drawings, in which embodiments are shown. This disclosure may, however, be embodied in many different forms and is not to be construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "combination thereof" means that a combination comprising at least one of the listed elements is present, optionally together with a like element not listed.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a monovalent group derived from a straight or branched chain saturated aliphatic hydrocarbon having the specified number of carbon atoms.

"Alkylene" as used herein means a divalent group derived from a straight or branched chain saturated aliphatic hydrocarbon having the specified number of carbon atoms.

"Hydroxyalkyl" as used herein means an alkyl group wherein at least one hydrogen is replaced with a hydroxyl group.

"Substituted" as used herein refers to replacing at least one hydrogen with a C1 to C3 alkyl group, a hydroxyl group, a cyano group, a nitro group, a sulfhydriyl group, a halogen (e.g., Cl, Br, I, or F), or a combination thereof, provided that the valence of the atom is not exceeded. In an embodiment, the substituent is a C1 to C3 alkyl group, a hydroxyl group, or a combination thereof.

In an embodiment, the method of imparting hydrophilicity to a surface of a material may include the steps of: providing a base material having a surface; applying and chemically fixing a siloxane oligomer represented by Chemical Formula 1 to the surface of the base material to form a siloxane-modified surface; and applying a glycidol compound represented by Chemical Formula 2 to the siloxane-modified surface and carrying out a reaction therebetween to form an organosiloxane coating having a N,N-bis(hydroxyalkyl)aminoalkyl group on the surface:

Chemical Formula 1 wherein in Chemical Formula 1, $R_1$, $R_2$, and $R_3$ are the same or different, and are each independently hydrogen or a C1 to C3 alkyl group, A is a single bond or a C1 to C5 alkylene group, and n ranges from 2 to 30;

Chemical Formula 2

In Chemical Formula 2, each R is the same or different, and is independently hydrogen, a C1 to C3 alkyl group, or a C1 to C3 hydroxyalkyl group, and

L is a substituted or unsubstituted C1 to C3 alkylene group.

In an embodiment, L is unsubstituted or substituted with a C1 to C3 alkyl group, a hydroxyl group, or a combination thereof.

The base material may include a hydroxyl group, a carboxyl group, or a combination thereof on its surface. The base material may include an organic material, an inorganic material, or an organic-inorganic hybrid material. Specifically, the base material may include various polymers such as polyester, polyethylene, polypropylene, polycarbonate, or polyvinylchloride, or natural materials such as wood or leather, a glass, a metal, a metal oxide or nitride such as $SiO_2$, $TiO_2$, $SnO_2$, $ZnO_2$, $Fe_2O_3$, $Al_2O_3$, AAO (anodic aluminum oxide), and $SiN_4$, a ceramic material, or a combination thereof, but is not limited thereto. The base material may have any shape such as a fiber, a film, a plate, a sphere, a cube, a cuboid, and a polyhedron, or an irregular shape, but is not limited thereto. The base material may be subjected to a surface treatment so that the surface of the base material has a hydroxyl group, a carboxyl group, or a combination thereof on the surface. Non-limiting examples of the surface treatment may include a corona treatment, an ultraviolet ("UV") treatment, a plasma treatment, or a chemical treatment using hydrogen peroxide, hexafluoride isopropanol, or an acid such as concentrated or dilute sulfuric acid.

In an embodiment, the method may impart hydrophilicity to various materials by forming an organosiloxane coating having an N,N-bis(hydroxyalkyl)aminoalkyl group via molecular assembly on a surface of the material. The method may first include applying and chemically fixing the siloxane oligomer represented by Chemical Formula 1 on the surface of the base material to provide a siloxane-modified surface. In the second step of, the method may further include applying and chemically fixing the glycidol compound represented by Chemical Formula 2 to the siloxane-modified surface to form an organosiloxane coating having an N,N-bis(hydroxyalkyl) aminoalkyl group.

Specific examples of the siloxane oligomer represented by Chemical Formula 1 include oligo(aminopropyl)ethoxysilane, oligo(aminopropyl)methoxysilane, oligo(aminoethyl)methoxysilane, oligo(aminoethyl)ethoxysilane, oligo(aminobutyl)ethoxysilane, oligo(aminobutyl)methoxysilane, oligo(aminopentyl)ethoxysilane, and oligo(aminopentyl)methoxysilane, but are not limited thereto. A combination comprising at least one of the foregoing siloxane oligomers may be used. The siloxane oligomer may be oligo(aminopropyl)ethoxysilane represented by Chemical Formula 3.

Chemical Formula 3 n = 5, 10, 15

Specific examples of the glycidol compound represented by Chemical Formula 2 include oxiranylmethanol, (3-propyl-2-oxiranyl)methanol, oxiranylethanol, 2-(2-methyl-2-oxiranyl)ethanol, and oxiranylpropanol, but are not limited thereto. A combination comprising at least one of the foregoing glycidol compounds may be used.

For example, the glycidol compound may be oxiranylmethanol represented by Chemical Formula 4.

Chemical Formula 4

Initially, the siloxane-modified surface is prepared by applying the siloxane oligomer represented by Chemical Formula 1, such as oligo(aminopropyl)ethoxysilane, to the material surface and chemically fixing, i.e., reacting the same with a reactive group on the surface, e.g., a hydroxyl group (see, for example, Reaction Scheme 1).

Reaction Scheme 1

+ base material

The chemical fixing of the siloxane oligomer may involve dissolving the siloxane oligomer in an appropriate solvent, e.g., a C1 to C10 alcohol to prepare a siloxane oligomer solution, and wetting (e.g., soaking) the surface of the base material with the siloxane oligomer solution, followed by drying and/or heating the wetted surface in the air, or in an oven. The siloxane oligomer represented by Chemical Formula 1 may have an appropriate solubility in order to uniformly modify (e.g., coat) the surface of the base material with siloxane moieties. Drying and/or heating may enable the siloxane oligomer represented by Chemical Formula 1 to be chemically fixed (reacted) on the surface of the base material.

The siloxane oligomer having a desired value of "n" may be prepared by reacting a proper amount of trialkoxysilane compound having an aminoalkyl group in the presence of an appropriate amount of water.

The concentration of the siloxane oligomer solution is not particularly limited and may range from about 0.05 to about 10 percent by weight ("weight % or "wt %"), specifically from about 0.1 to about 1 wt %, based on a total weight of the solution. The temperature of drying and/or heating in the air is not particularly limited and may be room temperature (about 20° C.) or higher, specifically a temperature of about 30° C. to 150° C. In addition, the time for drying and/or heating is not particularly limited, and may be selected from about 5 minutes to about 24 hours.

Due to a condensation reaction of an alkoxy group of the oligomer with a reactive functional group (e.g., a hydroxyl group) on the surface of material, the siloxane oligomer of Chemical Formula 1 is covalently fixed on the surface of a material, thus forming micro- or nano-coating containing the siloxane oligomer of Chemical Formula 1 or a polysiloxane derived therefrom (see, Reaction Scheme 1).

The weight of the organosiloxane coating formed on the surface of the material after wetting, drying and/or heat treatment may be estimated by an increase in the weight of the material, and may be expressed as a percentage of the initial weight of the material. If after single soaking, drying and heat treatment the material gain does not reach desired values, then soaking, drying and heat treatment of the material may be repeated until the weight gain does not reach the desired values. The coatings thus formed may have a micrometer (e.g., 1 to 100 micrometer) or nanometer (e.g., 1 to 999 nanometer) thickness as desired for the particular application.

Next, the glycidol compound represented by Chemical Formula 2 may be used in the molecular assembly. Specifically, the surface of the siloxane-modified surface may be treated with the glycidol compound either neat or as a solution containing the glycidol compound. Subsequent drying, heating, or drying and heating in the air or in an oven may trigger a condensation reaction of grafted aminopropyl containing organosiloxane coating with a glycidol compound (e.g., oxiranyl methanol). As a result, the glycidol compound may react with the amino groups of the organosiloxane coating fixed on the surface of the base material to form the hydrophilic N,N-bis(1,2-dihydroxypropyl)aminopropyl groups thereon (see, for example, Reaction Scheme 2).

The concentration of the glycidol solution is not particularly limited and may be selected as desired. For example, the concentration of the glycidol solution may range from about 1 to about 50 wt %, based on a total weight of the solution but is not limited thereto. The temperature of drying or heating in the air is also not particularly limited and it may be room temperature (or about 20° C.) or higher, specifically a temperature of about 30° C. to about 150° C. In addition, the time for drying and/or heating may not be particularly limited, and for example, may be selected from about 5 minutes to about 24 hours.

Figure 1:
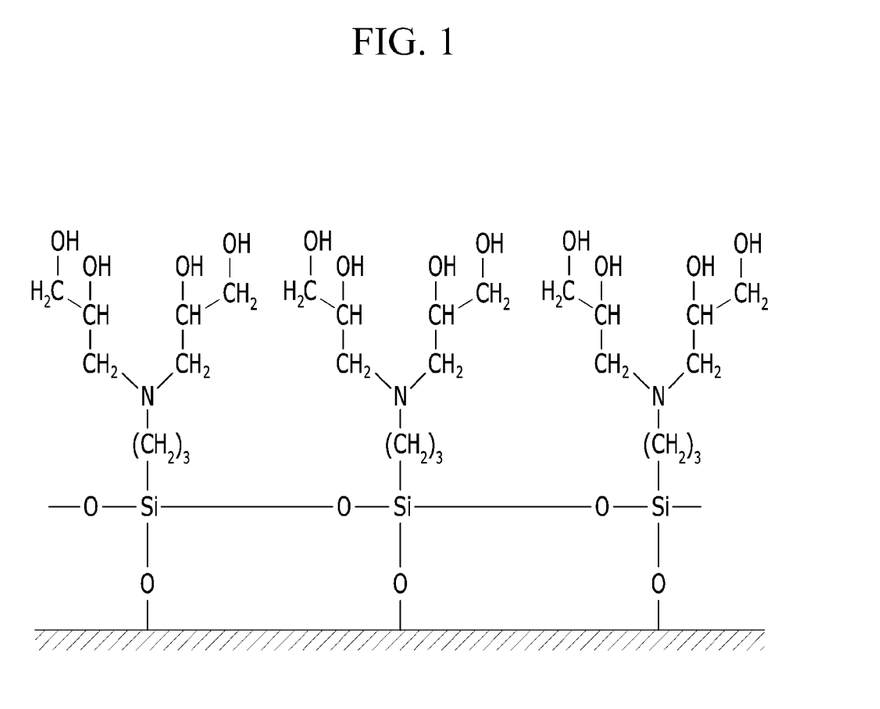
FIG. 1 schematically shows a chemical structure of the coatings formed on a material surface in accordance with an embodiment.

By the aforementioned method of molecular assembly, the surface may be modified by a coating layer of "brush geometry" as illustrated in FIG. 1.

The presence in the coatings of hydrophilic (water-soluble) N,N-bis(hydroxyalkyl)aminoalkyl groups may add hydrophilicity to the material surface.

While not wanting to be bound by a theory, it is understood that the mechanism of the formation of hydrophilic organosiloxane coatings on the surface of silicate glass is based on the interaction of reactive hydrophilic alkoxysilyl groups of the siloxane oligomer (e.g., oligo(aminopropyl)ethoxysiloxane (I-III)) with silanolic groups present on the surface of silicate glass (see, Reaction Scheme 3).

In Reaction Scheme 3, ethanol may be separated and removed during the drying and/or the heat treatment of the material, specifically heat treatment.

While not wanting to be bound by a theory, it is also understood that, the mechanism of the formation of hydrophilic organosiloxane coatings is based on the interaction of grafted aminopropyl containing coatings with the glycidol compound (see, for example, Reaction Scheme 2), leading to formation of the hydrophilic N,N-bis(hydroxyalkyl)aminoalkyl groups on the siloxane-modified surface (i.e., the surface of the organosiloxane coatings).

While not wanting to be bound by a theory, it is understood that the mechanism of the formation of hydrophilic organosiloxane coatings on the surface of a polyester film is based on the interaction of reactive hydrophilic alkoxy (e.g., ethoxy) groups of the siloxane oligomer of Chemical Formula 1 (e.g., oligo(aminopropyl)ethoxysiloxane (I-III)) with the terminal carboxyl (—COON) and hydroxyl (—OH) groups, located on the surface of a polyester film (see, for example, Reaction Scheme 4).

Reaction Scheme 4

In Reaction Scheme 4, ethanol may be separated and removed by the drying and/or the heat treatment of the material, specifically heat treatment.

While not wanting to be bound by a theory, it is also understood that the mechanism of the formation of hydrophilic organosiloxane coatings is based on the interaction of grafted aminopropyl containing coatings with the glycidol compound (see, Scheme 2), leading to formation of the hydrophilic N,N-bis(1,2-dihydroxypropyl)aminoalkyl groups on the organosiloxane coating surface.

In another embodiment, an article having a hydrophilically-modified surface may include a base material and an organosiloxane coating chemically fixed, for example formed, on a surface of the base material, wherein the organosiloxane coating is formed by a reaction of a siloxane oligomer represented by Chemical Formula 1, or a polysiloxane derived therefrom with a glycidol compound represented by Chemical Formula 2 and having an N,N-bis(hydroxyalkyl)aminoalkyl group, and the siloxane oligomer or the polysiloxane derived therefrom is chemically fixed on the surface of the base material.

Chemical Formula 1

In Chemical Formula 1,
$R_1$, $R_2$, and $R_3$ are the same or different, and are each independently hydrogen or a C1 to C3 alkyl group,
A is a single bond or a C1 to C5 alkylene group, and
n ranges from 2 to 30;

Chemical Formula 2 wherein in Chemical Formula 2,
each R is the same or different, and is independently hydrogen, a C1 to C3 alkyl group, or a C1 to C3 hydroxyalkyl group, and
L is a substituted or unsubstituted C1 to C3 alkylene group.

In this embodiment, the base material, the siloxane oligomer represented by Chemical Formula 1, the glycidol compound represented by Chemical Formula 2, and the formation of N,N-bis(hydroxyalkyl)aminoalkyl by the reaction therebetween are the same as set forth above.

As used herein, the term "chemically fixing" means a linking through a bond (e.g., a covalent bond) formed by interaction between the compounds.

The infrared spectroscopy spectrum of the coating may display vibrational bands for a C—OH bond, a C—N bond, a Si—O—Si bond, a Si—O—C bond, and a Si—C bond. The organosiloxane coating may further include a vibrational band for a C(=O)O bond. The IR-spectra of the modified samples of materials contain bands of valent vibrations of the C—OH bonds in the 3635-3625 cm$^{-1}$ range, for C(=O)OR bonds—in the 1750-1730 cm$^{-1}$ range, for C—N bonds—in the 1,230-1030 cm$^{-1}$ range, for Si—O—Si bonds—in the 1080-1020 cm$^{-1}$ range, for Si—O—C bonds—in the 880-810 cm$^{-1}$ range, and deformation vibrations of Si—C bonds in the 1260-800 cm$^{-1}$ range, which is consistent with the formation of the aforementioned organosiloxane coating.

The article includes a coating formed on the base material and thereby has a hydrophilically modified surface, and the surface of the coating has a water contact angle of about 20° or less. Such a low level of water contact angle has an effect of preventing dew condensation phenomenon at the surface of the article. Therefore, such an article may find utility in various applications requiring the prevention of the dew condensation. For example, the article may be an interior or exterior part material for various appliances such as a refrigerator, an air conditioner, and a humidifier, or an anti-fogging glass or a glass use in vehicles.

Hereinafter, embodiments are illustrated in more detail with reference to examples. It should be understood, however, that the following are exemplary embodiments and therefore are not limiting.

EXAMPLES

Example 1

The surface of a silicate glass is wetted with an ethanolic or aqueous solution of a siloxane oligomer represented by the following chemical formula (I) in a concentration of 0.1% and 1%, respectively, dried in the air and heat-treated at a temperature of 140° C. to fix the siloxane oligomer on the surface of the glass.

(I)

The silicate glass having the siloxane-modified surface is wetted with a 10% ethanolic solution of oxiranylmethanol, dried in the air, and heat-treated at a temperature of 140° C. The water contact angle is determined by tensiometer "Tracker IT Concept" (France) two minutes (in static conditions) after the water drop had been placed on the surface of the base material.

Example 2

The silicate glass is treated in the same manner as set forth in Example 1, except that 0.1% and 1% solutions of the siloxane oligomer represented by the following chemical formula (II) are used.

(II)

The water contact angle listed in Table 1 confirms an increase in hydrophilicity of the silicate glass.

Example 3

The silicate glass is treated in the same manner as set forth in Example 1, except that 0.1% and 1% solutions of the siloxane oligomer represented by the following chemical formula (III) are used.

(III)

The water contact angle listed in Table 1 confirms an increase in hydrophilicity of the silicate glass.

Example 4

A base material is treated in the same manner as set forth in Example 1, except that a polyester film is used as the base material. The water contact angle listed in Table 1 confirms an increase in hydrophilicity of the polyester film.

Example 5

A base material is treated in the same manner as set forth in Example 1, except that a polyester film is used as the base material and 0.1% and 1% solutions of the siloxane oligomer represented by the following chemical formula (II) are used.

(II)

The water contact angle listed in Table 1 confirms an increase in hydrophilicity of the polyester film.

Example 6

A base material is treated in the same manner as set forth in Example 1, except that a polyester film is used as the base material and 0.1% and 1% solutions of the siloxane oligomer represented by the following chemical formula (III) are used.

(III)

The water contact angle listed in Table 1 confirms an increase in hydrophilicity of the polyester film.

TABLE 1

Contact angel of wetting the surface of materials, modified by organosiloxane coatings, containing the hydrophilic glycidol groups

| Material | Oligomer | Concentration of oligomer solution, % | Area of the modified surface, S, $cm^2$ | Weight of organosiloxane coating on the material surface | | | | Weight of glycidol | | | | Contact angel, degree |
|---|---|---|---|---|---|---|---|---|---|---|---|---|
| | | | | g | mmole | $g/cm^2$ | $mmole/cm^2$ | mmole | g | $mmole/cm^2$ | $g/cm^2$ | |
| Silicate glass | I | 0.1 | 6 | 0.1 | 0.9 | 0.017 | 0.15 | 1.8 | 0.13 | 0.1 | 0.007 | 17 |
| | | 1 | | 1 | 9.07 | 0.17 | 1.51 | 18.15 | 1.34 | 3.025 | 0.22 | 16 |
| | II | 0.1 | | 0.1 | 0.9 | 0.017 | 0.15 | 1.8 | 0.13 | 0.1 | 0.007 | 16 |
| | | 1 | | 1 | 9.07 | 0.17 | 1.51 | 18.15 | 1.34 | 3.025 | 0.22 | 16 |

TABLE 1-continued

Contact angel of wetting the surface of materials, modified by organosiloxane coatings, containing the hydrophilic glycidol groups

| Material | Oligomer | Concentration of oligomer solution, % | Area of the modified surface, S, cm² | Weight of organosiloxane coating on the material surface | | | | Weight of glycidol | | | | Contact angel, degree |
|---|---|---|---|---|---|---|---|---|---|---|---|---|
| | | | | g | mmole | g/cm² | mmole/cm² | mmole | g | mmole/cm² | g/cm² | |
| | III | 0.1 | | 0.1 | 0.9 | 0.017 | 0.15 | 1.8 | 0.13 | 0.1 | 0.007 | 16 |
| | | 1 | | 1 | 9.07 | 0.17 | 1.51 | 18.15 | 1.34 | 3.025 | 0.22 | 16 |
| Polyester film | I | 0.1 | 18 | 0.1 | 0.9 | 0.0055 | 0.15 | 1.8 | 0.13 | 0.1 | 0.007 | 18 |
| | | 1 | | 1 | 9.07 | 0.055 | 0.50 | 18.15 | 1.34 | 1.008 | 0.07 | 17 |
| | II | 0.1 | | 0.1 | 0.9 | 0.0055 | 0.15 | 1.8 | 0.13 | 0.1 | 0.007 | 17 |
| | | 1 | | 1 | 9.07 | 0.055 | 0.50 | 18.15 | 1.34 | 1.008 | 0.07 | 17 |
| | III | 0.1 | | 0.1 | 0.9 | 0.0055 | 0.15 | 1.8 | 0.13 | 0.1 | 0.007 | 17 |
| | | 1 | | 1 | 9.07 | 0.055 | 0.50 | 18.15 | 1.34 | 1.008 | 0.07 | 17 |
| Silicate glass | Not | | | | | | | | | | | 46 |
| Polyester film | Not | | | | | | | | | | | 43 |

Analysis of the results of materials surface treatment described in examples 1-6, showed that the aforementioned method of imparting hydrophilicity to produces a variety of materials with a high level of hydrophilicity. Contact angle of the material surface decreases in 2.5-2.8 times by the use of 0.1 to 1% by weight of oligo(aminopropyl)ethoxysiloxane (I-III).

Thus, the aforementioned method of imparting hydrophilic properties allows an increase the hydrophilicity of the surface of a material (silicate glass, polyester films) of about 2.5-2.8 times. The hydrophilic ability of such organosiloxane coatings with hydrophilic N,N-bis(1,2-dihydroxypropyl)aminoalkyl groups surpasses that of the analogs not having the N,N-bis(1,2-dihydroxypropyl)aminoalkyl groups, and their production by the method of molecular assembly requires minimal amounts of initial material, i.e., siloxane oligomer.

While this disclosure has been described in connection with what is presently considered to be practical exemplary embodiments, it should be understood that the invention is not limited to the disclosed embodiments, but, on the contrary, is intended to cover various modifications and equivalent arrangements included within the spirit and scope of the appended claims.

What is claimed is:

1. A method of imparting hydrophilicity to a surface of a material, which comprises:
   providing a base material comprising a surface;
   applying and chemically fixing a siloxane oligomer represented by Chemical Formula 1 to the surface of the base material to form a siloxane-modified surface; and
   applying a glycidol compound represented by Chemical Formula 2 to the siloxane-modified surface and carrying out a reaction therebetween to form an organosiloxane coating comprising a N,N-bis(hydroxyalkyl)aminoalkyl group:

Chemical Formula 1 wherein in Chemical Formula 1,
$R_1$, $R_2$, and $R_3$ are the same or different, and are each independently hydrogen or a C1 to C3 alkyl group,
A is a single bond or a C1 to C5 alkylene group, and
n ranges from 2 to 30;

Chemical Formula 2 wherein in Chemical Formula 2,
each R is the same or different, and is independently hydrogen, a C1 to C3 alkyl group, or a C1 to C3 hydroxyalkyl group, and
L is a substituted or unsubstituted C1 to C3 alkylene group.

2. The method of claim 1, wherein the base material comprises an organic material, an inorganic material, or an organic-inorganic hybrid material, and comprises a hydroxyl group, a carboxyl group, or a combination thereof on the surface thereof.

3. The method of claim 1, further comprising subjecting the base material to a corona treatment, an ultraviolet treatment, a plasma treatment, or a chemical treatment using hydrogen peroxide, hexafluoride isopropanol, or an acid to have a hydroxyl group, a carboxyl group, or a combination thereof on the surface before applying and chemically fixing the siloxane oligomer represented by Chemical Formula 1 to the surface of the base material.

4. The method of claim 1, wherein the siloxane oligomer represented by Chemical Formula 1 is oligo(aminopropyl)ethoxysilane, oligo(aminopropyl)methoxysilane, oligo(aminoethyl)methoxysilane, oligo(aminoethyl)ethoxysilane, oligo(aminobutyl)ethoxysilane, oligo(aminobutyl)methoxysilane, oligo(aminopentyl)ethoxysilane, oligo(aminopentyl)methoxysilane, or a combination thereof.

5. The method of claim 1, wherein the siloxane oligomer represented by Chemical Formula 1 has an n value ranging from 4 to 16.

6. The method of claim 1, wherein the glycidol compound represented by Chemical Formula 2 is oxiranylmethanol, (3-propyl-2-oxiranyl)methanol, oxiranylethanol, 2-(2-methyl-2-oxiranyl)ethanol, oxiranylpropanol, or a combination thereof.

7. The method of claim 1, wherein applying and chemically fixing the siloxane oligomer to the surface of the base material comprises wetting the surface of the base material with a solution comprising the siloxane oligomer, and drying, heating, or drying and heating the wetted surface.

8. The method of claim 7, wherein preparing the solution comprising the siloxane oligomer comprises dissolving the siloxane oligomer represented by Chemical Formula 1 in a C1 to C10 alcohol in an amount of about 0.05 to about 10 weight % based on a total weight of the solution.

9. The method of claim 1, wherein applying the glycidol compound to the siloxane-modified surface and carrying out the reaction therebetween comprises wetting the siloxane-modified surface with a solution comprising the glycidol compound, and drying, heating, or drying and heating the wetted surface.

10. The method of claim 9, wherein preparing the solution containing the glycidol compound comprises dissolving the glycidol compound represented by Chemical Formula 2 in a C1 to C10 alcohol in an amount of about 1 to about 50 weight % based on the total weight of the solution.

* * * * *